(12) United States Patent
Camp

(10) Patent No.: US 9,855,884 B2
(45) Date of Patent: Jan. 2, 2018

(54) LOAD RETAINING GATE ASSEMBLY

(71) Applicant: Sharon Camp, Brooklyn, OH (US)

(72) Inventor: Sharon Camp, Brooklyn, OH (US)

(73) Assignee: Sharon Camp, Bradenton, FL (US)

( * ) Notice: Subject to any disclaimer, the term of this patent is extended or adjusted under 35 U.S.C. 154(b) by 0 days.

(21) Appl. No.: 15/654,815

(22) Filed: Jul. 20, 2017

(65) Prior Publication Data
US 2017/0313365 A1   Nov. 2, 2017

Related U.S. Application Data

(63) Continuation-in-part of application No. 14/749,681, filed on Jun. 25, 2015.

(51) Int. Cl.
*B60P 7/08* (2006.01)
*B60P 7/14* (2006.01)
*B62D 33/03* (2006.01)
*B62D 33/037* (2006.01)

(52) U.S. Cl.
CPC .............. *B60P 7/14* (2013.01); *B62D 33/03* (2013.01); *B62D 33/037* (2013.01)

(58) Field of Classification Search
CPC .......... B60P 7/14; B62D 33/03; B62D 33/037
USPC ....... 410/129, 140, 141, 143, 145, 149, 150, 410/151
See application file for complete search history.

(56) References Cited

U.S. PATENT DOCUMENTS

| 6,227,781 B1 * | 5/2001 | Smith | ................... B60P 7/15 410/149 |
| 8,371,782 B2 * | 2/2013 | Hill | ................... B60P 7/14 410/121 |

* cited by examiner

*Primary Examiner* — Stephen Gordon
(74) *Attorney, Agent, or Firm* — RG Patent Consulting, LLC; Rachel Gilboy

(57) ABSTRACT

A load retaining gate assembly is provided to restrain the movement of items stored in the bed of a vehicle. The load retaining gate assembly is made of two gate members arranged in sliding relationship and has at least one compression spring-loaded assembly. One gate member slides into another gate member. A compression spring is held in place within the gate members for biasing the length of the gate assembly against side walls of a vehicle bed. The gate assembly is held in place by the pressure put by the spring against the side walls of the vehicle bed. The gate assembly can be positioned anywhere across the width of the vehicle bed and can be easily removed from its position when not needed and locked in a compressed state.

14 Claims, 2 Drawing Sheets

LOAD RETAINING GATE ASSEMBLY

CROSS-REFERENCE TO RELATED APPLICATION

The present application is a Continuation-in Part and is related to and claims priority from prior patent application Ser. No. 14/749,681 filed Jun. 25, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of load retaining devices and more specifically relates to a load retaining gate assembly for use in the bed of a pick-up truck or other similar vehicles. The load retaining device can be positioned anywhere across the width of the vehicle bed and removed when not in use.

2. Description of the Related Art

Pick-up trucks, SUV's, vans and other similar vehicles are commonly used to transport different kinds of items. Such items may include purchased grocery items, furniture, vegetables, etc. These items which are transported in the vehicle bed, are prone to spill out and spread to different locations in the vehicle bed as the driver of the vehicle proceeds along the road. It is very troublesome for a person to have to climb into a bed of a transport vehicle to retrieve spilled articles.

To avoid this troublesome inconvenience, different systems have been developed to keep the stored items in their place in the vehicle bed. In general, a tie down assembly or a rectangular divider is placed in the vehicle bed to keep the stored items in place.

For example, U.S. Pat. No. 5,385,435 issued to Frederick A. Musta on Jan. 31, 1995, discloses a system for securing articles to a load bearing structure during transportation. However, this and other tie, down systems cannot secure articles of all sizes. Furthermore, it can be secured in only specific positions in the vehicle where the tie down structure is available. U.S. Pat. No. 5,235,913 issued to William F. Baker on Oct. 16, 1993, discloses a rectangular shaped truck bed partition consisting of mounting members for mounting a cargo cage to a truck bed wherein the cargo cage retains the stored item or items. This cargo cage can be positioned in only one specific position in the vehicle bed. Another invention, U.S. Pat. No. 6,629,807 issued to Bernardo on Oct. 7, 2003, discloses rectangular shaped load retaining devices which can be positioned anywhere along the length of the vehicle bed. U.S. Pat. No. 5,427,486 issued to Gerald D. Green on Jun. 27, 1995, discloses a rectangular shaped load retaining device which can be extended in width to fit the vehicle bed and can be positioned anywhere along the length of the vehicle bed. Still other references due consideration are U.S. Pat. No. 2,988,135 issued to A. D. Caminiti on Jun. 13, 1961; U.S. Pat. No. 6,227,781 issued to Smith et al. on May 8, 2001; and U.S. Pat. Pub. No. 2009/0096243.

These load retaining devices suffer from a lot of the same issues. Some of them cannot be easily detached from their position in the vehicle bed when they are not in use. Many of the net structured load retainer devices do not secure small items well and they spill through the openings in the net. Also, most of these load retaining devices cannot be easily positioned anywhere across the width along the vehicle bed. Therefore, none of the above inventions and patents, taken either singly or in combination, is seen to describe the invention as will be claimed herein.

Ideally, a load retaining device should provide a convenient means for securing articles that are being transported, should be positionable across the width of and anywhere along the length of a vehicle bed, and be easily removed when not in use and, yet would operate reliably and be manufactured at a modest expense.

BRIEF SUMMARY OF THE INVENTION

The general purpose and object of the present invention is to provide a load retaining gate assembly to restrain the movement of the items stored in the bed of a vehicle. The stored items may be groceries or other purchased items. The load retaining assembly restricts the movement of all the stored articles including small items, hence a person does not need to dive in the bed of a vehicle to collect the stored items which may have spilled and scattered during transport.

The load retaining gate assembly is made of two gate members arranged in a sliding relationship and having at least one compression spring-loaded assembly. One gate member slides into another gate member and the load retaining gate assembly is biased outwardly to position it against interior side walls of a vehicle bed. The length of the load retaining gate assembly can be made to different sizes per the width of the vehicle bed. The load retaining gate assembly can be positioned anywhere across the width of the vehicle bed. When the load retaining gate assembly is not required to restrain any item in the vehicle bed, it can be easily removed from its position and stored in a compressed condition.

An object of the present invention is to provide a load retaining gate assembly positionable across the width of a vehicle bed per the amount of load to be secured. Furthermore, a method is also provided detailing an easy way to use and remove the load retaining gate assembly from its position in the vehicle bed and stored in a locked position when it is not in use.

For purposes of summarizing the invention, certain aspects, advantages, and novel features of the invention have been briefly described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following detailed description and drawings.

The present invention holds significant improvements and serves as a load retaining gate assembly. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Load Retaining Gate Assembly, which is constructed and operative according to the teachings of the present invention.

The various embodiments of the present invention will hereinafter be described in conjunction with the appended drawings, wherein like designations denote like elements.

DETAILED DESCRIPTION

Figure 1:
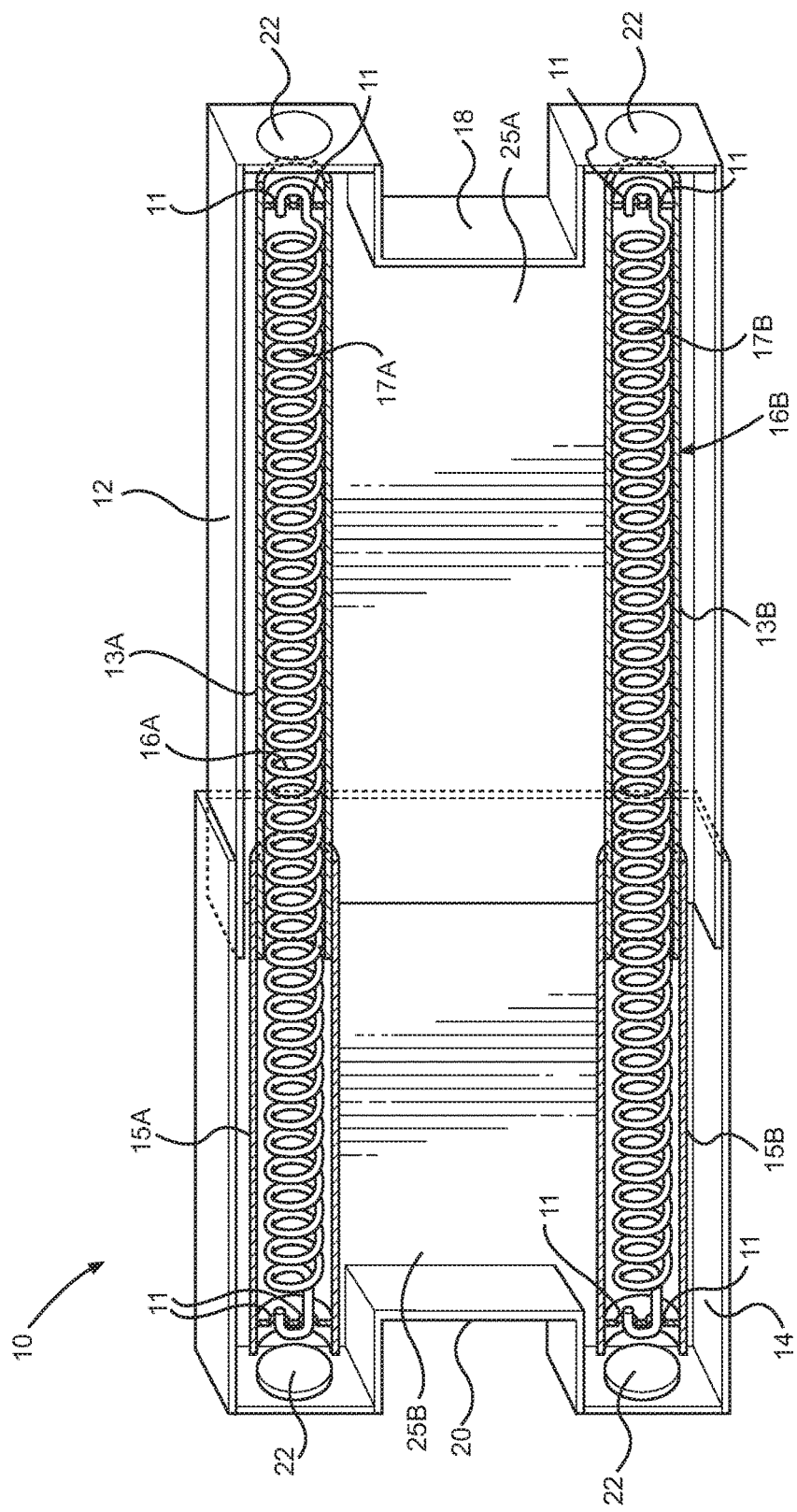
FIG. 1 shows a perspective view illustrating the Load Retaining Gate Assembly with the front side removed according to an embodiment of the present invention.
Figure 2:
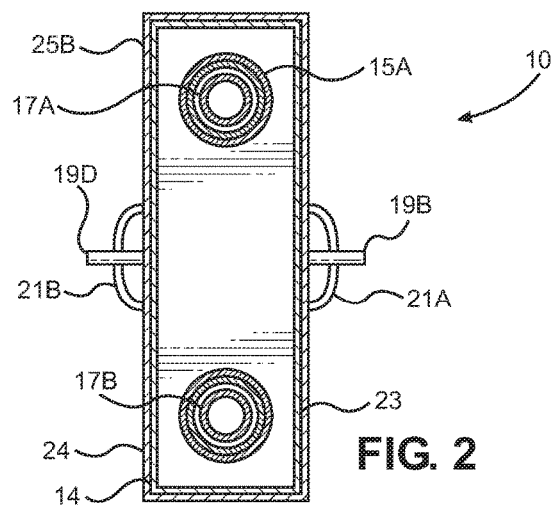
FIG. 2 is a perspective view illustrating a cross-sectional view of the small gate member according to an embodiment of the present invention of FIG. 1.
Figure 3:
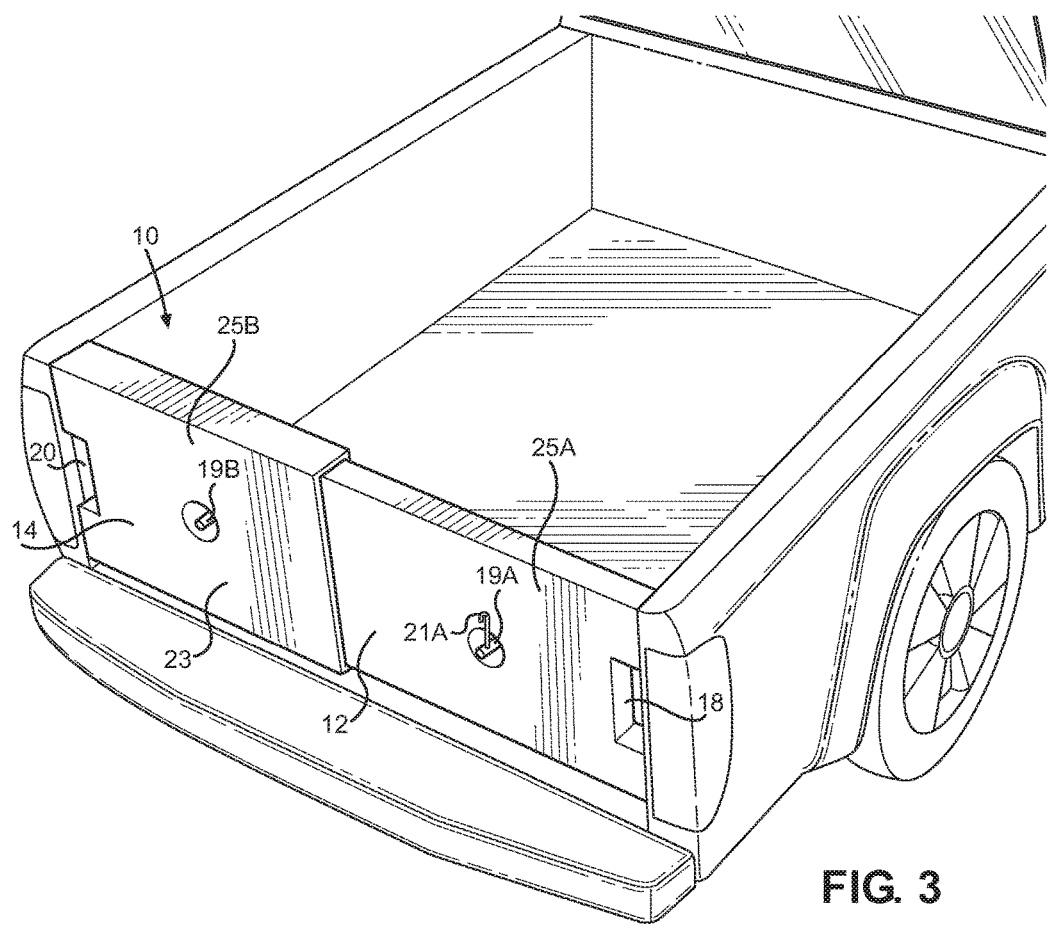
FIG. 3 is a perspective view of the Load Retaining Gate assembly in use with the bed of a truck according to an embodiment of the present invention of FIG. 1.

Referring to the drawings by numerals of reference there is shown in FIG. 1-3, a load retaining gate assembly 10. The load retaining gate assembly 10 (also referred to as gate assembly 10) is made of a first long gate member 12 and a second short gate member 14. First long gate member 12 is formed of a generally rectangular receptacle first casing member 25A. Second short gate member 14 is formed of a generally rectangular receptacle second casing 25B which is a little larger so as to slide over the first long gate member 12. The first and second receptacle casings 25A and 25B respectively may be of unitary construction or may be made of components that snap fit together or be assembled by screw threads or similar fasteners such that they may be easily assembled and disassembled.

First long gate member 12 includes a cut-out region 18 at the free end which provides a hand grasping area. Second short gate member 14 includes a cut-out region 20 at the free end which also provides a hand grasping area. These cut-out regions 18 and 20 allow a user to grasp the gate assembly 10 so that it may be compressed and moved. The gate assembly 10 has two compression spring-loaded assemblies 16A and 16B that each include a compression spring 17A and 17B respectively which bias first long gate member 12 and second short gate member 14 outwardly from one another.

The spring-loaded assemblies 16A and 16B are located one near the top and one near the bottom of the gate assembly 10 when viewed in an upright orientation and are attached to either the first long or second short gate members 12 and 14 at one free end thereof by a pair of eyelets 11. The compression springs 17A and 17B are encased in pipes 13A, 13B, 15A and 15B and are made of PVC or a similar material and which extend the length of the gate assembly 10. Pipes 15A and 15B are attached to the free end of the small gate member 14 by screw threaded attachments 22 which allow easy access to eyelets 11 and the compression springs 15A and 15B for replacement. Pipes 15A and 15B are of a larger diameter than pipes 13A and 13B such that they may slide over the pipes 13A and 13B as the gate members 12 and 14 are expanded or contracted as needed to fit the desired space. When the load retaining gate assembly 10 is in the extended position, the compression springs 17A and 17B put pressure against opposite sidewalls of a vehicle bed thereby holding the gate assembly 10 in place.

The load retaining gate assembly 10 is available in multiple shapes, sizes, thicknesses and or colors for different types of vehicles. The following dimensions are preferred but not limiting. The weight of the load retaining gate assembly 10 is 10 pounds. For a half-ton truck, the long gate member 12 of the load retaining gate assembly 10 is 31 inches long and 15.75 inches wide. The short gate member 14 of the load retaining gate assembly 10 is 20 inches long and 16 inches wide. When in an extended position, the load retaining gate assembly 10 is 51 inches long. The cut-out regions 18 and 20 are rectangular shaped and are 6 inches long and 2 inches wide.

For a three-quarter-ton truck, the long gate member 12 of the load retaining gate assembly 10 is 35 inches long and 19 inches wide. In an extended position, the load retaining gate assembly 10 is 75 inches long. The cut-out regions 18 and 20 are rectangular shaped and are 6 inches long and 2 inches wide.

To initially place the gate assembly 10 within the bed of a truck, the user places the locked gate assembly 10 across the width of a vehicle bed in the desired position either closer to the tailgate or closer to the cab of the vehicle by grasping one of the cut-out regions 18 and 20 and compressing the compression springs 17A and 17B against one of the sidewalls of the truck bed just enough to unlock the gate assembly which will be described in more detail hereinafter. Thus, the compression springs will naturally bias outwardly and a user may more easily place the gate assembly in the desired position. The compression springs 17A and 17B bias the long gate member 12 and the short gate member 14 against the sidewalls of a vehicle bed.

The gate assembly 10 has a first riveted post 19A and a second riveted post 19B centrally located on long gate member 12 and the small gate member 14 respectively of the gate assembly 10. Second riveted post 19B is on the short gate member 14 and first riveted post 19A is on the long gate member 12. First and second riveted posts 19A and 19B are in lateral alignment on the front side 23 of the gate assembly 10. A first J-shaped latch 21A is permanently attached yet able to swivel in a clockwise direction freely on riveted post 19A and is oriented to face upwardly. The free end of the first J-shaped latch 21A swivels upwardly and engages riveted post 19B on the short gate member 14 to lock the gate assembly 10 into a compressed state when not in use.

A second J-shaped latch 21B and third and fourth riveted posts 19C and 19D are employed on the rear side 24 of the gate assembly 10 and operate in the same manner as the first J-shaped latch 21A with the second J-shaped latch 21B permanently attached to and able to swivel in a counterclockwise direction from the third riveted post 19C to engage with the fourth riveted post 19D. Third riveted post 19C is on the long gate member 12. Fourth riveted post 19D is on the short gate member 14.

When the gate assembly 10 is not in use and in the locked position, the user places their hands in one of the cut-out sections 18 or 20, positions the opposite side of the gate assembly 10 against one of the interior sidewalls of a truck bed and gives a short compression so that the first J-latch 21A and second J-shaped latch 21B will swing downwardly and be released at one side from the second and fourth riveted posts 19B and 19D respectively on the front and rear sides 23 and 24. The gate assembly 10 is then in the unlocked position with the compression springs 17A and 17B naturally biasing firmly and outwardly against opposite sides of a truck bed whereby a load within the truck bed is held in place from shifting.

When a user desires to remove the gate assembly 10 from a truck bed for storage, the user will grasp one of the cut-out regions 18 or 20, then provide a pulling force. The compression springs 17A and 17B are contracted a sufficient length to allow one side of the gate assembly 10 to be pulled out toward the user and away from one side of the truck bed whereby the entire gate assembly 10 is easily removed from the truck bed entirely. The gate assembly 10 is then oriented to stand on one end and a user pushes down from the opposite end. First J-shaped latch 21A is rotated to engage the second riveted post 19B and the second J-shaped latch 21B is rotated to engage the fourth riveted post 19D thereby holding the load retaining gate 10 in a locked state that is compressed and compact for easy storage.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

What is claimed is new and desired to be protected by Letters Patent is set forth in the appended claims:

1. A load retaining gate assembly for use with a vehicle bed wherein said load retaining gate assembly is configured to be releasably positioned against side walls of a vehicle bed to restrain movement of items stored therein, said load retaining gate assembly comprising:
   a first long gate member formed of a generally rectangular first casing member;
   said first long gate member including a cut-out region for receiving a user's hand, and further including within said first casing member a pair of long gate pipes;
   a second short gate member formed of a generally rectangular second casing member;
   said second short gate member including a cut-out region for receiving a user's hand; and further including within said second casing member, a pair of short gate pipes, wherein said second short gate member is configured to slide over and partially enclose said first long gate member and wherein said pair of short gate pipes are configured to slide over and partially enclose said pair of long gate pipes;
   a pair of spring-loaded assemblies;
   each said spring loaded assembly including a compression spring which is encased within each of said pair of long gate pipes and each of said pair of short gate pipes to extend substantially an entire length of said load retaining gate assembly, whereby said first long gate member and said second short gate member are biased outwardly from each other for engaging said side walls of said vehicle bed.

2. The load retaining gate assembly of claim 1, wherein said first and second casing members are formed as hollow receptacles.

3. The load retaining gate assembly of claim 1, wherein said pair of long gate pipes are threadedly coupled to said first casing member at one end thereof.

4. The load retaining gate assembly of claim 1, wherein said pair of short gate pipes are threadedly coupled to said second casing member at one end thereof.

5. The load retaining gate assembly of claim 1, wherein each said compression spring is coupled to either said first casing member or said second casing member at one end thereof by a pair of eyelets.

6. The load retaining gate assembly of claim 1, wherein said first long gate member has a front side and a rear side and wherein said front side includes a first riveted post fixedly attached thereto.

7. The load retaining gate assembly of claim 6, wherein said second short gate member has a front side and a rear side and wherein said second gate member front side includes a second riveted post fixedly attached thereto.

8. The load retaining gate assembly of claim 6, wherein said first long gate member has said front side and said rear side and wherein said rear side includes a third riveted post fixedly attached thereto.

9. The load retaining gate assembly of claim 7, wherein said second short gate member has said front side and said rear side and wherein said second gate member rear side includes a fourth riveted post fixedly attached thereto.

10. The load retaining gate assembly of claim 7 wherein said first riveted post includes a first J-shaped latch affixed respectively thereto configured to allow rotational movement thereof, whereby said first J-shaped latch swings in a clockwise direction from said first riveted post to allow locking engagement with said second riveted post.

11. The load retaining gate assembly of claim 9, wherein a third riveted post includes a second J-shaped latch affixed respectively thereto configured to allow rotational movement thereof, whereby said second J-shaped latch swings in a counter-clockwise direction from said third riveted post to allow locking engagement with said fourth riveted post.

12. A method of using a load retaining gate assembly within a vehicle bed by:

providing a load retaining gate assembly for use with a vehicle bed wherein
said load retaining gate assembly is configured to be releasably positioned against side walls of a vehicle bed to restrain movement of items stored therein, said load retaining gate assembly comprising:
a first long gate member formed of a generally rectangular first casing member;
said first long gate member including a cut-out region for receiving a user's hand, and further including within said first casing member a pair of long gate pipes;
a second short gate member formed of a generally rectangular second casing member;
said second short gate member including a cut-out region for receiving a user's hand, and further including within said second casing member, a pair of short gate pipes, wherein said second short gate member is configured to slide over and partially enclose said first long gate member and wherein said pair of short gate pipes are configured to slide over and partially enclose said pair of long gate pipes;
a pair of spring-loaded assemblies;
each said spring loaded assembly including a compression spring which is encased within each of said pair of long gate pipes and each of said pair of short gate pipes to extend substantially an entire length of said load retaining gate assembly, whereby said first long gate member and said second short gate member are biased outwardly from each other for engaging said side walls of said vehicle bed;
at least one latching mechanism connected to said first long gate member and said second short gate member including at least a pair of first and second riveted posts and at least one J-shaped latch pivotally connected to said first post whereby said J-shaped latch is rotated clockwise and connected to said second riveted post thereby locking said first long gate member to said second short gate member in a fixed position;
grasping said cut-out region of said first long gate member;
positioning said short gate member perpendicular against an interior side wall of a truck bed,
providing a compressive force sufficient to allow said J-shaped latch to disconnect and unlock from said second riveted post thereby allowing said spring-loaded assemblies to bias outwardly whereby said load retaining gate assembly engages opposite interior sidewalls of a vehicle bed for the purpose of retaining a load within said bed whereby compressive force of said spring assemblies holds said load retaining gate in place.

13. The method of claim 12, whereby a user removes said load retaining gate assembly from a vehicle bed by:
grasping said cut-out region of said first long gate member;
pulling said first long gate member toward said user thereby disengaging said first long gate member from an interior sidewall of said vehicle bed thereby allowing said user to remove said load retaining gate assembly from said vehicle bed.

14. The method of claim 12, whereby a user can easily store said load retaining gate assembly by:
standing said load retaining gate assembly on one end thereof;
providing a compressive force,
whereby said compression springs are contracted a sufficient length to allow said J-shaped latch to rotate and engage said second riveted post thereby locking said load retaining gate assembly in a compressed and compact state to allow for easy storage.

* * * * *